United States Patent
Behrens et al.

(10) Patent No.: US 11,077,949 B2
(45) Date of Patent: Aug. 3, 2021

(54) DUAL TURBINE THERMAL MANAGEMENT SYSTEM (TMS)

(71) Applicant: The Boeing Company, Chicago, IL (US)

(72) Inventors: William W. Behrens, Sunset Hills, MO (US); Andrew R. Tucker, Glendale, MO (US)

(73) Assignee: THE BOEING COMPANY, Chicago, IL (US)

( * ) Notice: Subject to any disclaimer, the term of this patent is extended or adjusted under 35 U.S.C. 154(b) by 286 days.

(21) Appl. No.: 16/153,081

(22) Filed: Oct. 5, 2018

(65) Prior Publication Data
US 2020/0108937 A1   Apr. 9, 2020

(51) Int. Cl.
| B64D 13/06 | (2006.01) |
|---|---|
| F01D 15/10 | (2006.01) |
| F02C 3/04 | (2006.01) |
| F02C 9/18 | (2006.01) |
| F01D 15/00 | (2006.01) |
| F02C 6/08 | (2006.01) |

(52) U.S. Cl.
CPC .......... *B64D 13/06* (2013.01); *F01D 15/005* (2013.01); *F01D 15/10* (2013.01); *F02C 3/04* (2013.01); *F02C 6/08* (2013.01); *F02C 9/18* (2013.01); *B64D 2013/0618* (2013.01); *B64D 2013/0648* (2013.01)

(58) Field of Classification Search
CPC .................................................... F02C 7/224
See application file for complete search history.

(56) References Cited

U.S. PATENT DOCUMENTS

| 2,925,712 | A | * | 2/1960 | London | F02C 7/224 60/785 |
|---|---|---|---|---|---|
| 3,153,331 | A | * | 10/1964 | Rogers | B64D 13/06 62/241 |
| 5,124,052 | A | * | 6/1992 | Hardaker | F02C 7/224 210/774 |
| 5,511,374 | A | * | 4/1996 | Glickstein | F02C 6/08 60/782 |
| 5,782,077 | A | | 7/1998 | Porte | |
| 5,860,283 | A | * | 1/1999 | Coleman | B64D 13/06 62/402 |
| 5,887,445 | A | * | 3/1999 | Murry | B64D 13/06 62/402 |
| 6,415,595 | B1 | * | 7/2002 | Wilmot, Jr. | F02C 7/224 60/785 |
| 6,457,318 | B1 | * | 10/2002 | Lui | F25B 9/004 62/87 |

(Continued)

FOREIGN PATENT DOCUMENTS

| GB | 971163 A | * | 9/1964 | ............. B64D 13/06 |
|---|---|---|---|---|
| GB | 2240813 A | * | 8/1991 | ............... F02C 7/04 |

*Primary Examiner* — Gerald L Sung
*Assistant Examiner* — Marc J Amar
(74) *Attorney, Agent, or Firm* — Gates & Cooper LLP

(57) ABSTRACT

A thermal management system for an aircraft engine. The thermal management system extracts interstage engine bleed air from the engine's compressor and performs three stage cooling of the interstage engine bleed air using two heat exchangers and a vapor cycle system evaporator. The cooled air is then further cooled by expansion through a set of turbines and subsequently used as a heat sink for heat loads on the aircraft.

20 Claims, 9 Drawing Sheets

(56) References Cited

U.S. PATENT DOCUMENTS

| | | | | |
|---|---|---|---|---|
| 8,522,572 B2 * | 9/2013 | Coffinberry | ............ | B64D 13/06 62/402 |
| 9,222,411 B2 | 12/2015 | Sennoun | | |
| 10,207,809 B2 * | 2/2019 | Koerner | ................ | B64D 13/08 |
| 10,239,624 B2 * | 3/2019 | Behrens | .................... | F02C 6/08 |
| 2003/0126880 A1 * | 7/2003 | Zywiak | ................ | B64D 13/06 62/402 |
| 2007/0266695 A1 * | 11/2007 | Lui | ........................ | B64D 13/06 60/204 |
| 2010/0043396 A1 * | 2/2010 | Coffinberry | ............... | F02K 3/06 60/266 |
| 2010/0131169 A1 * | 5/2010 | DiAntonio | ................ | F02C 9/00 701/100 |
| 2012/0000205 A1 * | 1/2012 | Coffinberry | ............... | F02C 7/14 60/806 |
| 2012/0192578 A1 * | 8/2012 | Finney | ................... | B64D 13/06 62/87 |
| 2012/0297789 A1 * | 11/2012 | Coffinberry | ............ | B64D 13/06 62/402 |
| 2013/0118709 A1 * | 5/2013 | Slack | ........................ | F26B 5/04 165/95 |
| 2015/0151845 A1 * | 6/2015 | Jones | ...................... | B64D 37/04 244/135 R |
| 2015/0166187 A1 * | 6/2015 | Durbin | .................. | B64D 13/08 62/79 |
| 2015/0314877 A1 * | 11/2015 | McAuliffe | ................ | F02C 6/08 62/61 |
| 2015/0322866 A1 | 11/2015 | Scipio et al. | | |
| 2015/0354464 A1 * | 12/2015 | Hillel | ..................... | F04D 27/0261 415/1 |
| 2016/0362999 A1 * | 12/2016 | Ho | ........................ | F04D 29/321 |
| 2017/0233082 A1 * | 8/2017 | Behrens | ................ | B64D 13/06 62/7 |
| 2017/0233083 A1 * | 8/2017 | Behrens | ................. | F02C 7/224 62/79 |
| 2017/0267359 A1 * | 9/2017 | Army | ....................... | F25B 9/06 |
| 2018/0038657 A1 * | 2/2018 | Pal | ......................... | F28D 15/00 |
| 2018/0215475 A1 * | 8/2018 | Hurt | ...................... | B64D 41/00 |
| 2019/0162121 A1 * | 5/2019 | Staubach | ............... | B64D 13/08 |
| 2020/0010203 A1 * | 1/2020 | Ho | ........................ | B64D 13/04 |
| 2020/0086998 A1 * | 3/2020 | Retersdorf | ............ | B64D 13/06 |
| 2020/0189749 A1 * | 6/2020 | Ho | ........................ | B64D 13/06 |

\* cited by examiner

DUAL TURBINE THERMAL MANAGEMENT SYSTEM (TMS)

BACKGROUND

1. Field

The present disclosure relates to a thermal management system.

2. Description of the Related Art

Air cycle systems have been used to provide air conditioning for commercial and military aircraft. The air cycle employs high pressure bleed air extracted from the final stage of the engine compressor and a ram air heat sink to generate cold air for aircraft cooling. However, such air cycle systems cannot practically provide sufficient cooling for heat loads in next generation aircraft. What is needed is a novel thermal management system that can efficiently dissipate significantly increased heat loads while maintaining desirable vehicle performance. The present disclosure satisfies this need.

SUMMARY

The present disclosure describes a thermal management system including a fan drawing a first portion of ram air into an engine compressor in an aircraft engine core, and a second portion of the ram air into an engine duct bypassing the aircraft engine core; a duct system transporting a portion of the interstage compressed air (engine bleed air) from the compressor; a plurality of heat exchangers and a Vapor Cycle System (VCS) evaporator coupled to the duct system for cooling the engine bleed air in three stages; and optionally also a set of turbines for expanding the cooled air after the three stage cooling.

The engine compressor includes a first compressor stage, a final compressor stage, and one or more intermediate compressor stages between the first compressor stage and the final compressor stage. Each of the intermediate compressor stages compress the compressed air outputted from a previous compressor stage so as to form the interstage compressed air.

A first heat exchanger connected to the duct system and the engine duct transfers first heat from the engine bleed air in the duct system to the second portion of the ram air in the engine duct, so as to cool the engine bleed air into first cooled air in the duct system. A second heat exchanger is connected to a fuel line and to the duct system downstream of the first heat exchanger, so that the second heat exchanger transfers second heat from the first cooled air to the fuel in the fuel line and the first cooled air is cooled into second cooled air in the duct system. The VCS evaporator is connected to the duct system downstream of the second heat exchanger so as to cool the second cooled air into third cooled air in the duct system.

The set of turbines includes first and second turbines connected to the duct system downstream of the VCS evaporator. The first turbine expands the third cooled air cooled from the engine bleed air compressed in the intermediate compressor stage using a first pressure ratio, so as to form first expanded cooled air. The second turbine expands the third cooled air cooled from the engine bleed air compressed in the intermediate compressor stage using a second pressure ratio greater than the first pressure ratio, so as to form second expanded cooled air.

A third heat exchanger is coupled to the duct system downstream of the turbines, so that the third heat exchanger transfers third heat from a heat load to the first expanded cooled air or the second expanded cooled air when the heat load is coupled to the third heat exchanger. Examples of heat load include, but are not limited to, aircraft cabin air conditioning and aircraft avionics.

The TMS can be embodied in many ways including, but not limited to, the following examples.

1. The TMS connected to an aircraft engine including the fan coupled to the aircraft engine core, the aircraft engine core further including a combustor; a low pressure turbine; a high pressure turbine; and an engine rotor shaft connecting the engine compressor, the low pressure turbine, and the high pressure turbine, wherein the combustor burns the fuel using the compressed air so as to form exhaust gases that rotate the low pressure turbine and the high pressure turbine so as to drive the engine rotor shaft and the engine compressor.

2. The TMS of example 1, further including a gearbox connecting the turbine shaft and the engine rotor shaft, the gearbox transmitting power to the engine rotor shaft in response to the flow and expansion of the third cooled air through the first turbine or the second turbine driving the turbine shaft.

3. The TMS of example 1 or example 2, further comprising a generator connected to the turbine shaft, wherein the generator generates electrical power E in response to flow and expansion of the third cooled air through the first turbine or the second turbine.

4. The TMS of one or any combination of the previous examples, wherein the heat load comprises at least one system selected from an aircraft avionics system and an aircraft cabin air conditioning system.

5. A supersonic military aircraft comprising the TMS of one or any combination of the previous examples.

6. The TMS of one or any combination of the previous examples further comprising an additional duct connected to an engine intake upstream of the fan, the additional duct transporting a third portion of the ram air to a fourth heat exchanger, the fourth heat exchanger thermally coupled to the fuel line upstream of the second heat exchanger such that the fuel is cooled by the third portion of the ram air prior to receiving the second heat from the first cooled air. In a further example, the fuel may pass through an additional fuel/ram air heat exchanger prior to entering the engine to reduce fuel temperature to an acceptable level. The additional heat exchanger enables the fuel to reject heat to ram air that has exited the VCS condenser.

7. The TMS of example 6 including an additional fan drawing a third portion of the ram air (122) into the additional duct so as to ensure an adequate flow of the third portion of the ram air during ground idle and ground speed operation of the aircraft engine.

8. The TMS of one or any combination of the previous examples, wherein the duct system includes a bypass loop comprising a conduit bypassing the first heat exchanger and the second heat exchanger so as to control an amount of the second heat transferred to the fuel.

9. The TMS of example 8 coupled to an aircraft propelled by an aircraft engine, the system further comprising a valve connected to the additional duct controlling flow of the third portion of the ram air to the fourth heat exchanger; a computer controlling opening and closing of the valve so that the third portion of the ram air flows to the fourth heat exchanger when the aircraft is flying subsonically at an altitude greater than 40000 feet, and flow of the third portion of the ram air to the fourth heat exchanger is suppressed or switched off when the aircraft is flying supersonically at an altitude greater than 40000 feet.

10. The TMS of one or any combination of the previous examples, wherein the TMS includes the first heat exchanger, the second heat exchanger, the VCS, and the set of turbines.

11. The TMS of one or any combination of examples 1-5, wherein the TMS does not include the first heat exchanger, the second heat exchangers, or the VCS and the cooling of the engine bleed air includes cooling by expansion of the engine bleed air through the first or the second turbine.

12. The TMS of one or any combination of examples 5-9, wherein the TMS does not include the set of turbines and the cooling is provided by the first heat exchanger, the second heat exchanger, and the VCS.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

TECHNICAL DESCRIPTION

Example Thermal Management System (TMS) Structure

Figure 1:
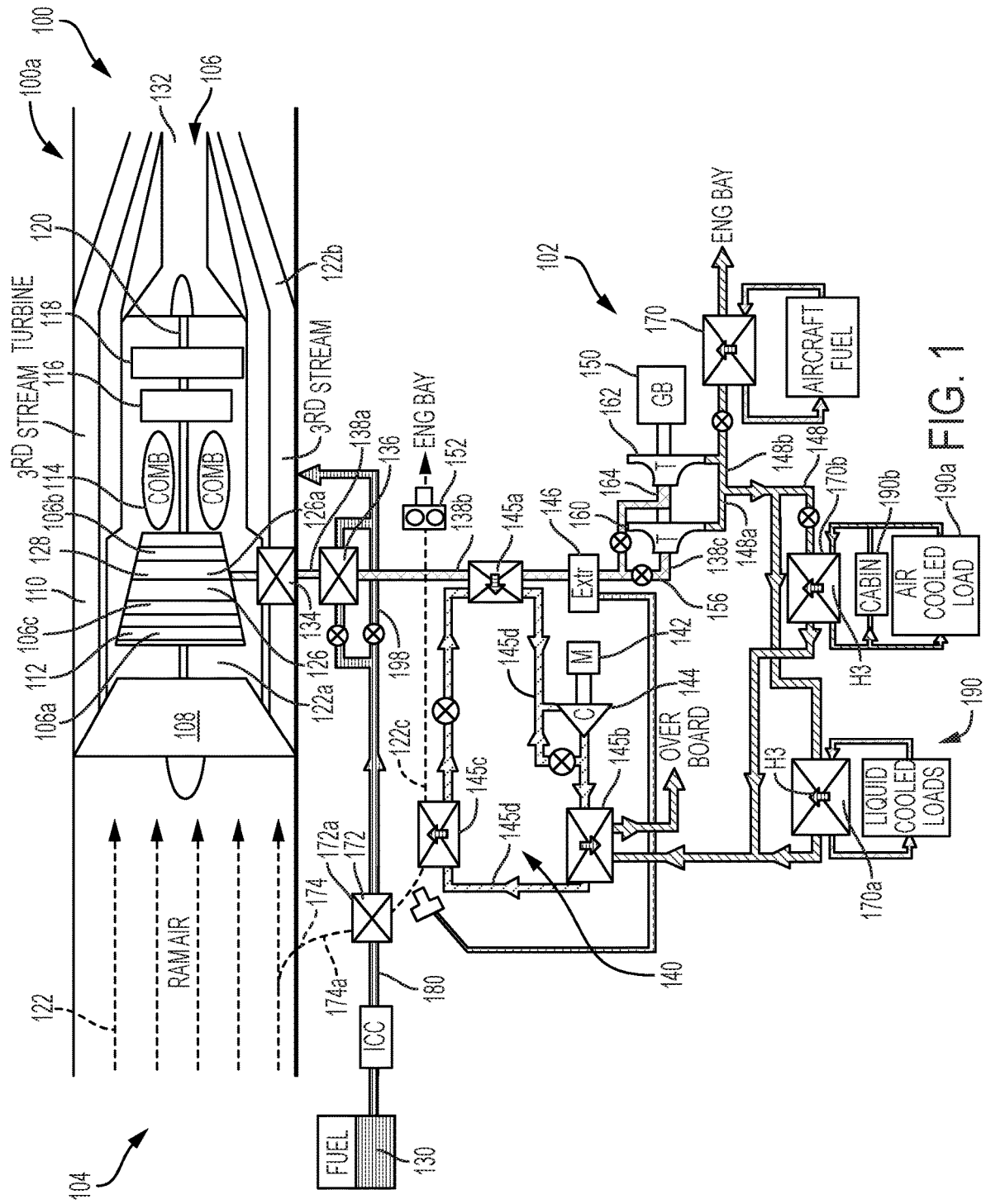
FIG. 1 illustrates an exemplary dual turbine Thermal Management System (TMS) according to one or more embodiments.

FIG. 1 illustrates an aircraft engine 100 connected or coupled to a TMS 102. The aircraft engine 100 includes an engine intake 104; an engine core 106; a fan 108 positioned upstream of the engine core 106; and an engine duct 110 bypassing the engine core 106. The engine core 106 includes an engine compressor 112; a combustor 114; low pressure turbine 116 and high pressure turbine 118; and an engine rotor shaft 120 connected to the engine compressor 112, the low pressure turbine 116 and high pressure turbine 118.

The fan 108 draws a first portion 122a of ram air 122 (received through the engine intake) into the engine compressor 112. The fan draws a second portion 122b of the ram air 122 though the engine duct so that the second portion 122b of the ram air 122 bypasses the engine core. As used herein, ram air is air inputted into the engine intake from the atmosphere.

The engine compressor 112 compresses the first portion 122a of the ram air 122 so as to form compressed air 126 inputted into the combustor. The engine compressor 112 includes a plurality of compressor stages each including turbines (a first compressor stage 106a, a final compressor stage 106b, and one or more (e.g., 1-10) intermediate compressor stages 106c between the first compressor stage and the final compressor stage). The intermediate compressor stages each compress the compressed air outputted from a previous compressor stage (e.g., first compressor stage 106a or previous intermediate compressor stage 106c) so as to form interstage compressed air 126a. Each of the first compressor stage 106a, final compressor stage 106b, and one or more intermediate compressor stages 106c may compress the air using one or more pressure ratios PR (ratio of the pressure of the compressed air outputted from the compressor stage to the pressure of the air inputted to the compressor stage). Examples of pressure ratios include, but are not limited to, pressure ratios in a range of 2:1 to 10:1. Pressure ratios may vary depending on flight conditions (e.g., engine thrust or aircraft speed).

The combustor burns fuel 130 using the compressed air 126 so as to form exhaust gases 132 used to propel the aircraft attached to the engine 100. Lower pressure exhaust gases 132 impinging on the low pressure turbine 116, and higher pressure exhaust gases 132 impinging on the high pressure turbine 118, rotate the low pressure turbine 116 and the high pressure turbine 118, respectively, so as to drive the engine rotor shaft 120 and the engine compressor 112. In this way, the exhaust gases can be used to power the compressor 112.

FIG. 1 further illustrates the TMS uses open air cycle capable of conditioning all aircraft heat loads using extremely cold air generated by expanding engine compressor interstage bleed air in dual low and high pressure ratio cooling turbines (a first turbine 160 and second turbine 162). The first turbine 160 and second turbine 162 are employed to ensure efficient expansion occurs under all flight conditions (e.g., low and high-speed operation of the aircraft or different pressure ratios used in the engine compressor 112).

The TMS operates as follows. A duct system 156 transfers a portion of the interstage compressed air 126a (hereinafter engine bleed air 128) from the engine compressor 112 so that, before entering the first turbine 160 or the second turbine 162, the engine bleed air 128 can be cooled three times. The engine bleed air 128 is first cooled into first cooled air 138a as it flows through an engine duct heat exchanger (e.g., first heat exchanger 134) which uses engine third stream air (e.g., second portion 122b of ram air 122) as the heat sink. Next, a second heat exchanger 136 uses the fuel 130 (that will be burned by the engine) to cool the first cooled air 138a, previously cooled using the first heat exchanger 134, into second cooled air 138b. Finally, the second cooled air 138b cooled by the fuel 130 is further cooled in a single stage vapor cycle system (VCS) 140 comprising a motor 142, compressor 144, evaporator 145a, condensers 145b, 145c, and water extractor 146. The VCS further cools the second cooled air 138b into third cooled air 138c and so as to ensure adequate water removal/moisture is achieved during ground idle operation and extremely cold temperature air outputted from the first turbine 160 and the second turbine 162 can be achieved at all flight conditions.

The engine bleed air (third cooled air 138c) cooled by the VCS 140 is expanded in the first turbine 160 or the second turbine 162 so as to further cool the third cooled air 138c. Expansion of the third cooled air 138c is achieved by flowing the third cooled air 138c either through (1) the first turbine 160 (designed for efficient low pressure ratio expansion) or (2) the second turbine 162 designed for high pressure ratio expansion (the third cooled air 138c does not flow through both the first turbine 160 and the second turbine 162). Which of the first turbine 160 or second turbine 162 is employed depends on the operating condition (pressure ratio). The low pressure turbine (first turbine 160) expands the third cooled air 138c cooled from the engine bleed air 128 compressed in the intermediate compressor stage 106c using a first pressure ratio, and the high pressure turbine (second turbine 162) expands the third cooled air 138c cooled from the engine bleed air 128 compressed in the intermediate compressor stage 106c using a second pressure ratio PR2 larger than the first pressure ratio PR1. Thus, the first turbine 160 expands the third cooled air 138c into first expanded cooled air 148a, and the second turbine 162 expands the third cooled air 138c into second expanded cooled air 148b. Although first turbine 160 is illustrated in front of second turbine 162, in another example the positioning can be reversed (first turbine 160 can also be positioned behind second turbine 162). Both the first turbine 160 and the second turbine 162 are connected to a single turbine shaft 164.

The first expanded cooled air 148a or the second expanded cooled air 148b is used to cool various heat loads on the aircraft (e.g., cabin air conditioning or aircraft avionics). In one or more examples, at flight conditions where the cooling power of the first expanded cooled air 148a or the second expanded cooled air 148b exceeds what is needed for aircraft avionic and crew station cooling, excess amounts of the first expanded cooled air 148a or the second expanded cooled air 148b are used to cool fuel 130 stored in the aircraft tanks to increase the heat sink capacity of the fuel 130. The excess amount of the first expanded cooled air 148a or the second expanded cooled air 148b is then used to provide additional cooling of the engine bay. Under some operating conditions, power generated from the expansion process is transmitted to the aircraft engine 100 by connecting the turbine shaft 164 to the gearbox 150 and the gearbox 150 to engine rotor shaft 120. After receiving the heat or being used as a heat sink, the first expanded cooled air 148a or the second expanded cooled air 148b is then rejected overboard (off the aircraft).

Example Operation of the Single Stage VCS

FIG. 1 further illustrates the VCS 140 comprising a single stage uses a circulating refrigerant 145d as the medium which absorbs and removes heat from the second cooled air 138b. Circulating refrigerant enters the compressor 144 as a saturated vapor and is compressed to a higher pressure and higher temperature so as to form superheated vapor. The superheated vapor enters the condenser 145b and is condensed using (and rejects waste heat to) a third portion 122c ram air 122 conveyed from the engine intake 104. After exiting the condenser 145b in the VCS, the third portion 122c of ram air 122 is also used to cool the engine bay before being rejected overboard. The superheated vapor also enters the condenser 145c and is condensed using (and rejects waste heat to) the first expanded cooled air 148a or the second expanded cooled air 148b that has absorbed aircraft heat loads.

The refrigerant 145d condensed in condensers 145b and 145c passed through an expansion valve 145e where it undergoes an abrupt reduction in pressure resulting in adiabatic flash evaporation of a part of the refrigerant 145d in liquid form and lowering of the temperature of the refrigerant 145d to a temperature below the temperature of the second cooled air 138b. The refrigerant 145d is passed through the coil or tubes in the evaporator 145a thermally coupled to the duct system 156 downstream of the first heat exchanger 134. The refrigerant 145d in the evaporator absorbs and removes heat from the second cooled air 138b so as to cool the second cooled air 138b into the third cooled air 138c.

A ram circuit fan 152 ensures an adequate flow of the third portion 122c of ram air 122 is realized during ground idle and low speed (e.g., ground speed) operation. To minimize the ram air heat sink requirement, water extracted from the engine bleed air 128 is injected into the third portion 122c of ram air 122 upstream of the condenser 145c.

Bypass Loop Example

In one or more examples, at high altitude subsonic flight, the third portion 122c of the ram air 122 is colder and used to cool the burn fuel 130 before the fuel 130 is used as a heat sink for the engine bleed air comprising the second cooled air 138b. A bypass loop 198 around the second heat exchanger 136 (exchanging heat between the fuel and the engine bleed air) is included in the architecture to control the amount of heat rejected to the fuel 130. Thus, the TMS can eliminate the need for fuel recirculation since it both cools burn fuel 130 and controls the amount of heat H2 the fuel 130 absorbs.

In one or more examples, at high altitude supersonic flight, the temperature of the burn fuel 130 can be significantly cooler than the temperature of the ram air 122. Under such flight conditions, the fuel 130 burned by the engine 100 cools the third portion 122c of ram air 122 enabling the VCS 140 to adequately reject waste heat (through condenser 145c) to the third portion 122c of ram air 122 at high speed conditions.

Example Characterization/Results

A study was conducted to assess the performance of the TMS system. Software was used to size and generate performance maps for the evaporator, condensers, heat exchangers, and the turbomachinery so as to condition the cooling loads listed in Table 1. In particular, for the study:

the unit weight of the TMS is 344.5 lbs (in one or more examples, an aircraft contains two such TMS units);

the maximum wheel diameters of the turbomachinery (wheel diameter of the compressor in the VCS and the wheel diameters of the first turbine 160 and the second turbine 162) are less than 10 inches;

the first turbine 160 expands air compressed in the engine compressor 112 in an intermediate compressor stage 106c using a pressure ratio (PR) of less than 3 (2.47) and the second turbine 162 expands air compressed in the engine compressor in an intermediate compressor stage 106c using a PR of greater than 3 (11.0).

Tables 1-4: Example Dual Turbine TMS Analysis Assumptions and Weight

TABLE 1

| Analysis assumptions | |
| --- | --- |
| Temperature | 1% hot day |
| Engine | GE VCESP2 v1.2 |
| Unit thermal load | Ground idle: 41.7 kW |
| | Cruise: 91.7 kW |
| | Supersonic Cruise: 111.1 kW |
| Cabin cooling | 3% of unit load |
| Air cooled avionics | 15% of unit load |
| Liquid cooled avionics | 82% of unit load |

TABLE 2

TMS control requirements

| | |
|---|---|
| Conditioned air temperature | 40° F. |
| Cockpit maximum air temperature | 40° F. |
| Avionic load maximum air temperature | 140° F. |
| Conditioned PAO compressor oil temperature in VCS | 60° F. |
| Maximum PAO compressor oil temperature in VCS | 90° F. |
| Maximum temperature of burn fuel delivered to engine | 235° F. |

TABLE 3

Component performance and construction

| | |
|---|---|
| VCS refrigerant | R-134a |
| Temperature of subcooled liquid out of VCS condenser | 5° F. |
| Temperature of superheated vapor out of VCS evaporator | 5° F. |
| Heat exchanger construction | Cross flow with offset surfaces |
| Non engine duct heat exchangers | Fabricated from aluminum |
| VCS compressor wheel diameter | 2.3 inches |
| Low pressure ratio turbine (first turbine 160) wheel diameter | 5.4 inches |
| High pressure ratio turbine (first turbine 162) wheel diameter | 9.5 inches |

TABLE 4

Unit weight summary

| Component | Weight in pounds (lbs) |
|---|---|
| Engine duct heat exchanger (first heat exchanger 134) | 96.1 |
| Fuel/Ram air heat exchanger (fourth heat exchanger 172) | 12.2 |
| Burn fuel heat exchanger (second heat exchanger 136) | 12.8 |
| Liquid cooled avionics heat exchanger (example of third heat exchanger 170a) | 23.5 |
| Air cooled avionics heat exchanger (example of third heat exchanger 170b) | 7.9 |
| Condenser 145b (bleed air) | 23.5 |
| Condenser 145c (Ram air) | 48.8 |
| VCS refrigeration charge | 8.6 |
| VCS compressor 144 | 2.1 |
| First turbine 160 (low pressure ratio) | 11.4 |
| Second turbine 162 (high pressure ratio) | 36.2 |
| Water separator | 7.7 |
| Fan 152 (Ram circuit) | 29.6 |
| Total weight | 344.5 |

Figure 2:
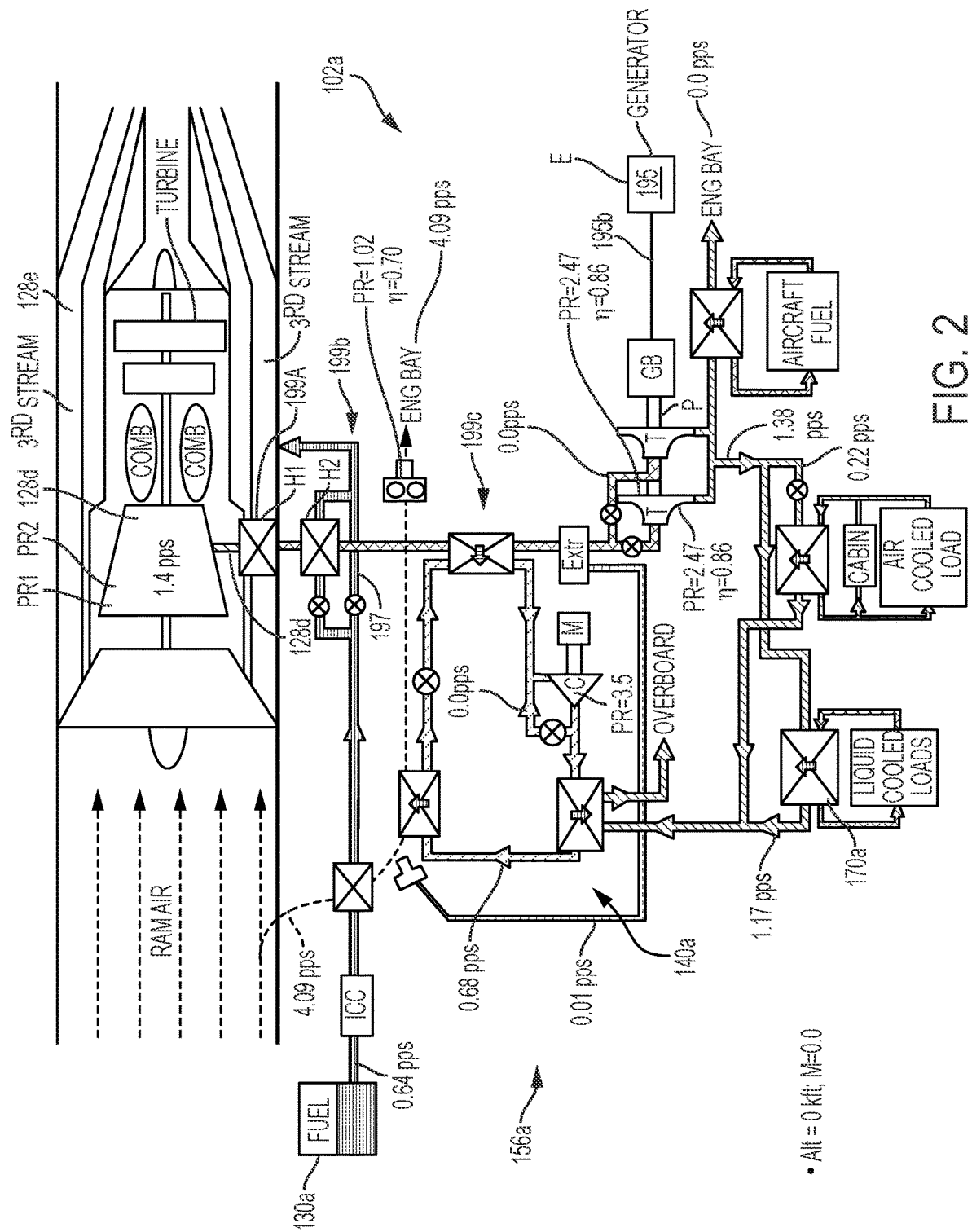
FIG. 2 illustrates exemplary performance of the TMS during ground idle operation (altitude Alt=0 feet (ft), speed (Mach number M)=0).
Figure 3A:
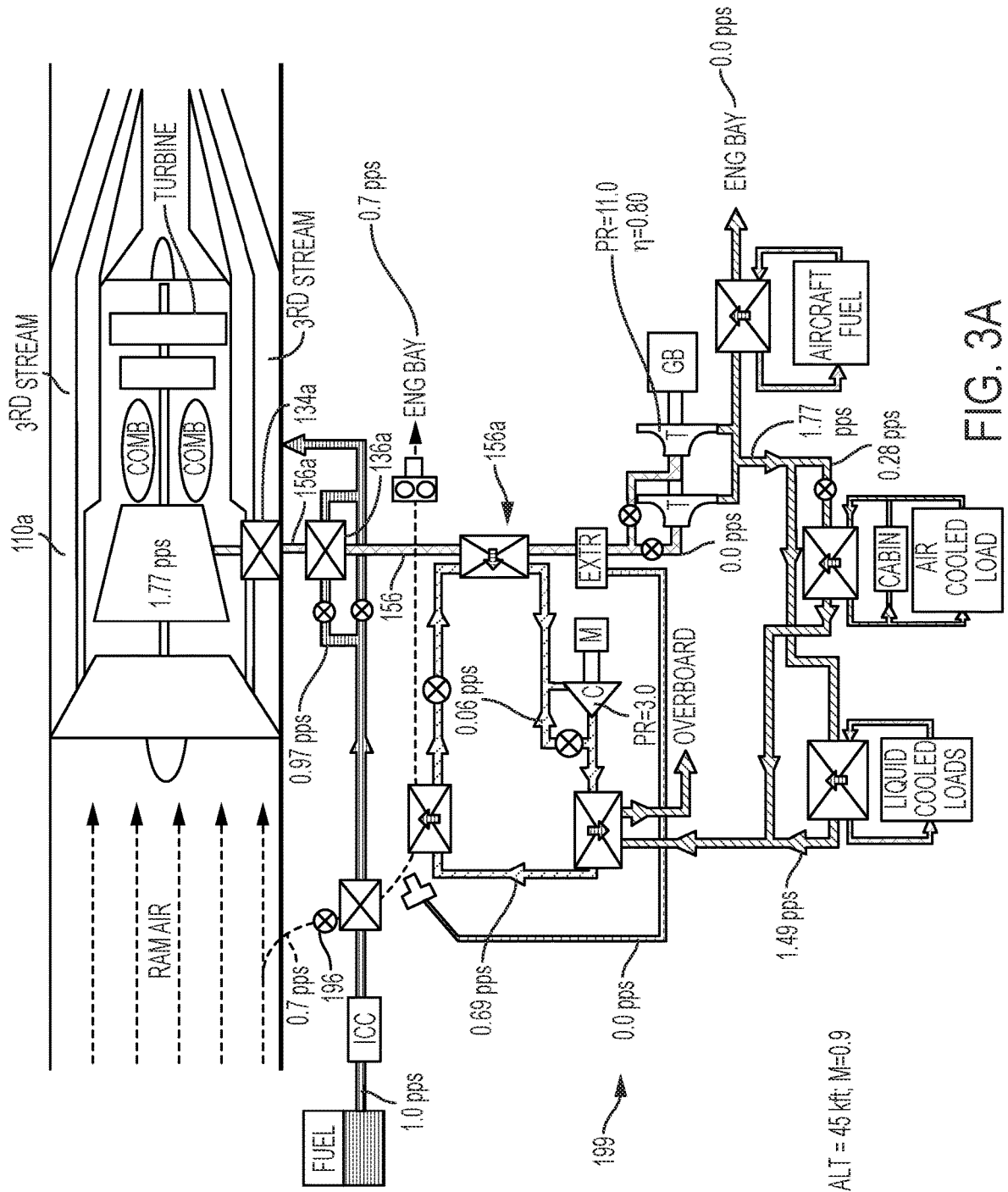
FIG. 3A illustrates exemplary performance of the TMS during subsonic cruise (altitude Alt=45000 ft, speed corresponding to a Mach number M=0.9).
Figure 3B:
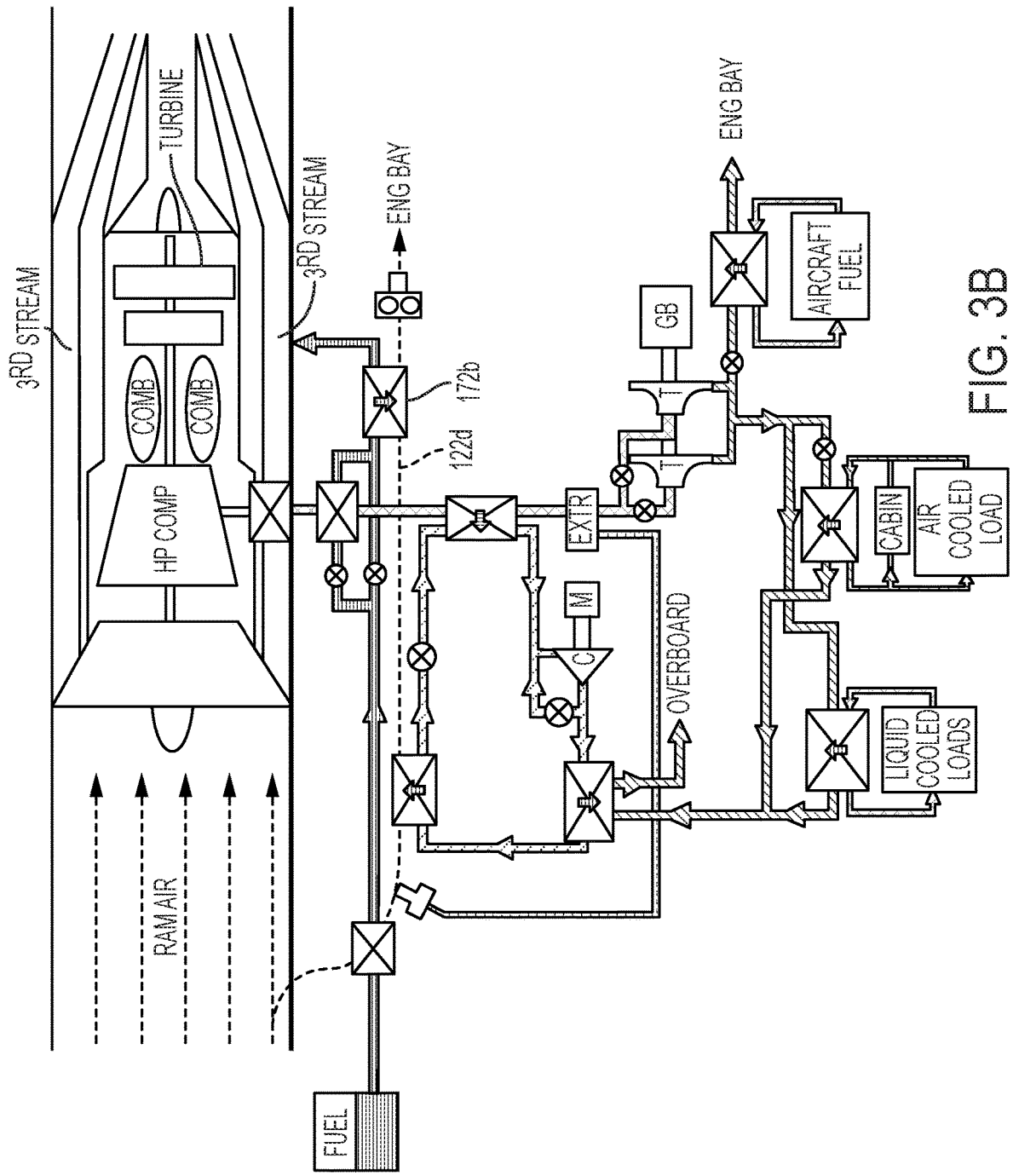
FIG. 3B illustrates positioning of an additional heat exchanger, according to one or more examples.
Figure 4:
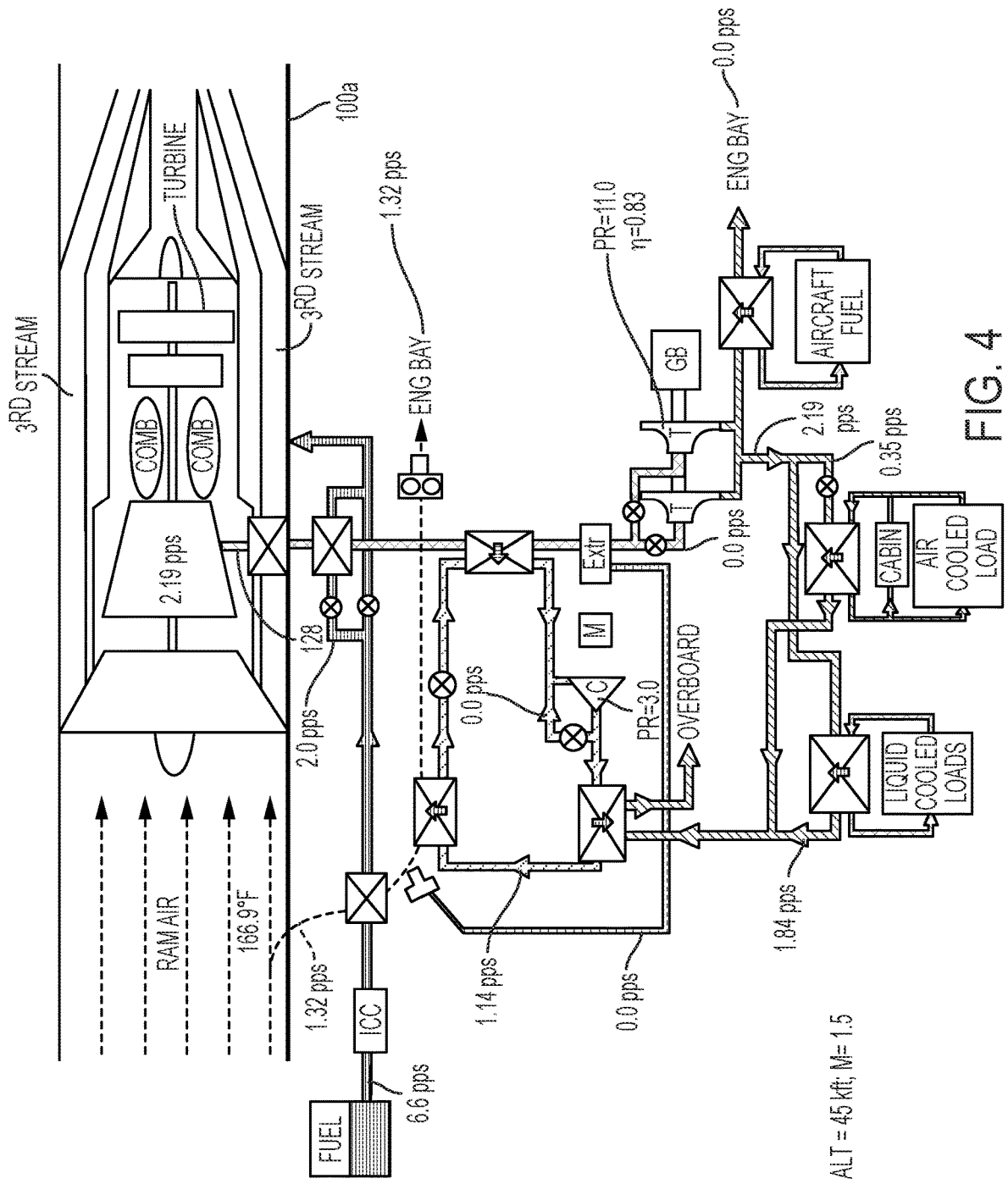
FIG. 4 illustrates exemplary performance of the TMS during supersonic cruise (altitude Alt=45000 ft, speed corresponding to a Mach number M=1.5).

The performance of the TMS of FIG. 1, sized according to the parameters in Table 1, is illustrated in FIGS. 2-4 for different flight conditions.

The results illustrate that, surprisingly and unexpectedly:

the TMS was able to reduce the temperature of the ram air from 120.0 degrees Fahrenheit (° F.) to −17.6° F. under engine ground idle conditions, as illustrated in FIG. 2;

the TMS was able to reduce the temperature of the ram air from 42.4° F. to −127.4° F. under high altitude subsonic cruise conditions, as illustrated in FIG. 3A; and the TMS was able to reduce the temperature of the ram air from 166.9° F. to −127.8° F. under high altitude supersonic cruise conditions, as illustrated in FIG. 4.

Process Steps

Method of Making a Thermal Management System.

Figure 5:
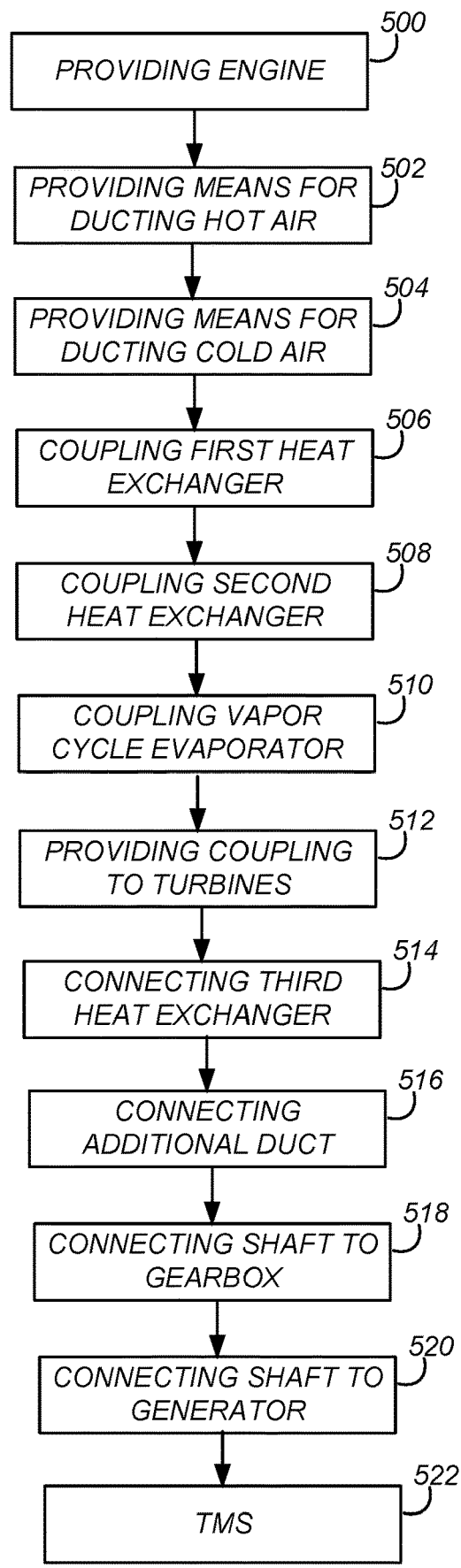
FIG. 5 is a flowchart illustrating a method of making the TMS.

FIG. 5 is a flowchart illustrating a method of making a thermal management system (referring also to FIGS. 1-4).

Block 500 represents optionally obtaining an engine (e.g., aircraft engine 100 as illustrated in FIG. 1) having an engine body 100a housing an engine core 106.

Block 502 represents providing first means 156a for transporting or conveying or directing hot air 128d from the engine core 106, e.g., to and through a TMS. Examples include one or more ducts, conduits, pipes, hoses, or a system of conduits, pipes, hoses or ducts (duct system 156). In one or more examples, the duct system 156 includes one or more valves and/or pumps. In one or more examples, the hot air 128d comprises the portion of interstage compressed air 126a (engine bleed air 128).

Block 504 represents providing second means 110a for transporting or directing cold air 128e outside the engine core 106. Examples of the second means 110a include, but are not limited to, the engine duct 110 in which case the cold air 128e comprises the second portion 122b of ram air 122 bypassing the engine core 106.

Block 506 represents operably connecting (e.g., thermally coupling) first heat exchanger means 134a (e.g., first heat exchanger 134) to the means for transporting the hot air 128d and the means for ecting the cold air 128e. The first heat exchanger means 134a transfers first heat H1 from the hot air 128d to the cold air 128e so as to cool the hot air 128d to first cooled air 138a having a temperature lower than the temperature of the hot air 128d. In one or more examples, the first heat exchanger 134 includes a coiled duct, pipe, or conduit (transporting the hot air 128d) having thermally conductive walls in thermal contact with/attached to a wall of an engine duct 110.

Block 508 represents operably connecting (e.g., thermally coupling) second heat exchanger means 136a for transferring/exchanging heat H2. Examples include a second heat exchanger 136 operably connected to the duct system 156 downstream of the first heat exchanger 134 so as to transfer second heat H2 from the first cooled air 138a to a cooling fluid (e.g., fuel 130) and cool the first cooled air 138a to second cooled air 138b having a temperature lower than the temperature of the first cooled air 138a. In one or more examples, the second heat exchanger 136 includes a coiled duct, pipe, or conduit (transporting the first cooled air) having thermally conductive walls thermally coupled to a fuel line.

Block 510 represents operably connecting (e.g., thermally coupling/connecting) means 140a for cooling the second cooled air 138b into third cooled air 138c. Examples include a VCS 140 operably connected to the duct system 156 downstream of the second heat exchanger 136.

Block 512 represents optionally operably connecting the duct system to the first turbine 160 and the second turbine 162. In one or more examples, the first turbine 160 is connected to a first output from the duct system 156 downstream of the evaporator 145a in the VCS 140 and the second turbine 162 is connected to a second output from the duct system 156 or first means 156a downstream of the evaporator 145a in the VCS 140. The first turbine 160 and the second turbine 162 are connected by a turbine shaft 164. As described herein, the first turbine 160 is connected so as to expand the third cooled air 138c cooled from the hot air 128d compressed in the compressor 112 in the engine core 106 using a first pressure ratio P1; and the second turbine 162 is connected so as to expand the third cooled air 138c cooled from the hot air 128d compressed in the engine core 106 when the hot air 128d is compressed in the compressor 112 in the engine core 106 using a second pressure ratio P2 larger than the first pressure ratio P1. The first turbine 160 expands the third cooled air 138c into first expanded cooled air 148a and the second turbine 162 expands the third cooled air 138c into second expanded cooled air 148c.

As used herein, the first turbine 160 and the second turbine 162 each comprise a turboexpander or an expansion turbine, a centrifugal or axial-flow turbine through which a high pressure gas is expanded to produce work that is often used to drive a compressor or generator. Work can be extracted from the expanding high pressure gas (which expansion can, in some examples, be approximated isentropic process) and the lower pressure exhaust gas from the first turbine 160 or the second turbine 162 is therefore at a lower temperature than the temperature of the third cooled air 138c.

Block 514 represents connecting a third heat exchanger 170a, 170b, or third heat exchanger means 170c, to the duct system 156 downstream of the first turbine 160 and the second turbine 162, for transferring heat H3 from a heat load 190 to the first expanded cooled air 148a and second expanded cooled air 148b. Examples of the heat load 190 include, but are not limited to, at least one system selected from an aircraft avionics system 190a and an aircraft cabin air conditioning system 190b. Examples of the third heat exchanger include, but are not limited to, a coiled duct, pipe, or conduit (transporting the first expanded cooled air 148a and/or the second expanded cooled air 148b) and having thermally conductive walls thermally coupled to the heat load.

Block 516 represents optionally operatively connecting means 174a for transporting a third portion 122c of ram air 122 (e.g., an additional duct 174) to the engine intake 104 upstream of the fan 108, so as to transport the third portion 122c of the ram air 122 to a fourth heat exchanger 172 or fourth heat exchanging means 172a. The fourth heat exchanger 172 is thermally coupled to the fuel line 180 upstream of the second heat exchanger 136 such that the fuel 130 is cooled by the third portion 122c of the ram air 122 prior to the fuel 130 receiving the second heat H2 from the first cooled air 138a. Examples of the fourth heat exchanger include, but are not limited to, a coiled duct, pipe, or conduit (transporting the third portion 122c or ram air 122) having thermally conductive walls thermally coupled to the fuel line.

Block 518 represents optionally connecting the turbine shaft 164 to a gearbox 150 so that the gearbox 150 can transmit power P to engine rotor shaft 120 in response to the third cooled air 138c impinging on and expanding through the first turbine 160 or the second turbine 162.

Block 520 represents optionally connecting a generator 195 to the turbine shaft 164 so that the generator can generate electrical power in response to the third cooled air 138c impinging on and expanding through the first turbine 160 or the second turbine 162. Examples of generator include, but are not limited to, a device comprising a rotor operatively connected to stator so as to generate electricity (e.g., dynamo or alternator) when the turbine shaft 164 turns the rotor.

Block 522 represents the end result, a TMS.

Fabrication steps can be added or omitted so that the TMS described herein may be embodied in many ways including, but not limited to, the following examples.

1. In a first example, the TMS 100 comprises a device 102a for cooling air and includes first means 156a (e.g., duct system 156); first heat exchanger means 134a for transferring first heat H1 from the hot air 128d (e.g., engine bleed air 128) to a first heat sink (e.g., cold air 128e) and cool the hot air 128d to first cooled air 138a; second heat exchanger means 136a (e.g., second heat exchanger 136) thermally coupled to the first means 156a so as to transfer second heat H2 from the first cooled air 138a to a fluid 130a (e.g., coolant or fuel 130) and cool the first cooled air 138a to second cooled air 138b; and means 140a for cooling (e.g., VCS 140) the second cooled air 138b into third cooled air 138c used to cool a heat load 190. The TMS is more efficient at cooling heat loads than an air cycle system using cooling engine bleed air outputted from the final compressor stage 106b, because there is less energy penalty for removing heat from the interstage engine bleed air 126a (as compared to removing the heat from engine bleed air outputted form the final compressor stage 106b).

2. In a second example, the cold air 128e acting as the first heat sink in the device 102a of example 1 is in an engine duct 110a bypassing the engine core 106 and the cold air 128e comprises a second portion 122b of ram air 122 outside the engine core 106.

3. In a third example, the TMS of one or any combination of the previous examples further includes the first turbine 160 for expanding the third cooled air 138c cooled from the hot air 128d compressed in the engine core 106 (intermediate compressor stage 106) using a first pressure ratio PR1; and the second turbine 162 for expanding the third cooled air 138c cooled from the hot air 128d compressed in the engine core 106 (intermediate compressor stage 106c) when the hot air 128d is compressed in the engine core 106 using a second pressure ratio PR2 larger than the first pressure ratio PR1. The expansion of the third cooled air 138c through the first turbine 160 or the second turbine further cools the third cooled air 138c into first expanded cooled air 148a or second expanded cooled air 148b that is cooler than the third cooled air 138c and therefore more effective as a heat sink for the head loads 190. Using dual turbines (first turbine 160 and second turbine 162) allows the efficiency of the expansion and cooling to be optimized for the third cooled air 138c generated under a variety of flight conditions and pressure ratios.

4. In a fourth example, the TMS of one or any combination of the previous examples 1-3 includes a third heat exchanger means 170c (e.g., third heat exchanger 170a, 170b) coupled to the first means 156a downstream of the means 140a for cooling (e.g., VCS 140) or downstream of the first turbine 160 and the second turbine 162. As described herein, when a heat load 190 is coupled to the third heat exchanger means 170c, the third heat exchanger means 170c (e.g., third heat exchanger 170a, 170b) transfers third heat H3 from the heat load 190 to the third cooled air 138c (or the first expanded cooled air 148a or the second expanded cooled air 148b). In this way, the TMS can be used to cool heat loads.

5. In a fifth example, the TMS of one or any combination of the previous examples 1-4 or 13 is connected to an aircraft engine 100 including a fan 108 coupled to an aircraft engine core 106 including a combustor 114; a low pressure turbine 116; a high pressure turbine 118; and an engine rotor shaft 120 connecting the engine compressor 112, the low pressure turbine 116, and the high pressure turbine 118. The combustor 114 burns the fuel 130 using the compressed air 126 so as to form exhaust gases 132 that rotate the low pressure turbine 116 and the high pressure turbine 118 so as to drive the engine rotor shaft 120 and the engine compressor 112.

6. In a sixth example, the TMS of one or any combination of the previous examples 1-5 or examples 13, 17, or 18 is connected to or includes a gearbox 150. The gearbox 150 can be used to connect the turbine shaft 164 and the engine rotor shaft 120 and transmit power P to the engine rotor shaft 120 from the turbine shaft 164 in response to the flow and expansion of the third cooled air 138c through the first turbine 160 or the second turbine 162 driving the turbine shaft 164. Thus, the expansion of the third cooled air 138c through the first turbine 160 and the second turbine 162 can also be used to power the engine 100, thereby reducing fuel consumption of the aircraft engine 100 and extending range of the aircraft powered by the engine.

7. In a seventh example, the TMS of one or any combination of the previous examples 1-6 or examples 13, 17, or 18 includes or is connected to a generator 195. The generator 195 is connected to the turbine shaft 164 and gearbox 150 with shaft 195b so as to generate electrical power E in response to flow and expansion of the third cooled air 138c through the first turbine 160 or the second turbine 162. Thus, the expansion of the third cooled air 138c through the first turbine 160 and the second turbine 162 can also be used to power electrical systems on the aircraft connected to the generator, thereby reducing fuel consumption of the aircraft engine 100 and extending range of the aircraft powered by the engine.

8. In an eighth example, the TMS of one or any combination of the previous examples or example 13 includes an additional duct 174 connected to an engine intake 104 upstream of the fan 108, the additional duct 174 transporting a third portion 122c of the ram air 122 to a fourth heat exchanger 172. The fourth heat exchanger 172 is thermally coupled to the fuel line 180 upstream of the second heat exchanger 136 such that the fuel 130 is cooled by the third portion 122c of the ram air 122 prior to receiving the second heat H2 from the first cooled air 138a. Cooling the fuel 130 in this way allows the fuel 130 to be more effective as a heat sink for the first cooled air 138a. In an embodiment of example 8, the fuel 130 may pass through an optional additional fuel/ram air heat exchanger 172b prior to entering the engine 100 to reduce the fuel temperature to an acceptable level. The additional heat exchanger 172b enables the fuel to reject heat to ram air 122d that has exited the VCS condenser 145c, as illustrated in FIG. 3B.

9. In a ninth example, the TMS of one or any combination of the previous examples 1-8 or example 13 includes means 174a (e.g., additional duct 174) for transporting a third portion 122c of the ram air 122 from the engine intake 104 of the aircraft engine 100 upstream of the fan 108. When the aircraft 706 is flying subsonically at an altitude greater than a threshold value (e.g., 40000 feet), fourth heat exchanging means 172a cools the fluid 130a (e.g., fuel 130) using the third portion 122c of the ram air 122 prior to the fluid 130a being used to cool the first cooled air 138a, because the third portion 122x of ram air 122 is cooler than the fluid 130a (e.g., fuel 130). As a result, the fluid 130a (e.g., fuel 130) is more effective as a heat sink for cooling the first cooled air 138a.

10. In a tenth example, the TMS of Examples 8 or 9 includes an additional fan 152 connected to the means 174a (e.g., additional duct 174) so as to draw the third portion 122c of the ram air 122 through the means 174a and provide an adequate flow of the third portion 122c of ram air to the fourth heat exchanger means 172a for cooling of the fluid 130a (e.g., fuel 130) during ground idle and ground speed operation of the aircraft engine 100. In this way, cooling of the fluid 130a can be achieved even at low speed operation of the engine 100 or aircraft.

11. In an eleventh example, a valve 196 is connected to the additional duct 174 of Examples 8 or 9 so as to control flow of the third portion 122c of the ram air 122 to the fourth heat exchanger means 172a; and a computer 802 is connected to control opening and closing of the valve 196 so that (1) the third portion 122c of the ram air 122 flows to the fourth heat exchanger means 172a when the fluid 130a (e.g., fuel 130) is warmer than the third portion 122c of the ram air 122 (e.g., when the aircraft 706 is flying subsonically at an altitude greater than a threshold value (e.g., 40000 feet) at which the fuel 130 is warmer than the third portion 122c of the ram air 122, and (2) flow of the third portion 122c of the ram air 122 to the fourth heat exchanger means 172a is suppressed or switched off when the fuel 130 is colder than the third portion 122c of the ram air 122 (e.g., when the aircraft 706 is flying supersonically at the altitude in (1), e.g., at the altitude greater than the threshold value, e.g., 40000 feet). In this way, the fluid 130a (e.g., fuel 130) can be cooled using the third portion 122c of the ram air 122 when the fluid 130a (e.g., fuel 130) is warmer than the third portion 122c and therefore less effective as a heat sink for the second cooled air 138a.

12. In a twelfth example, the first means 156a (e.g., duct system 156) of one or any combination of the previous examples 1-11 or example 13 includes a bypass loop 198 comprising a conduit 197 bypassing the first heat exchanger means 132a and the second heat exchanger means 134a so as to control an amount of the second heat H2 transferred to the fluid 130a (e.g., fuel 130). In this way, the temperature of the fluid 130a (e.g., fuel 130) can be controlled to optimize the effectiveness of the fluid 130a (e.g., fuel 130) as a heat sink for the first cooled air 138a.

13. In a thirteenth example, the TMS includes a fan 108 drawing a first portion 122a of ram air 122 into an engine compressor 112 in an aircraft engine core 106 and a second portion 122b of the ram air 122 into an engine duct 110 bypassing the aircraft engine core 106; the engine compressor 112 compressing the first portion 122a of the ram air 122 so as to form compressed air 126, the engine compressor 112 including a first compressor stage 106a, a final compressor stage 106b, and one or more intermediate compressor stages 106c between the first compressor stage 106a and the final compressor stage 106b, each of the intermediate compressor stages 106c compressing the compressed air 126 outputted from a previous intermediate compressor stage 106c or first compressor stage 106a so as to form interstage compressed air 126a; a duct system 156 transporting a portion of the interstage compressed air 126a (engine bleed air 128) from the engine compressor 112; a first heat exchanger 134 connected to the duct system 156 and the engine duct 110, the first heat exchanger 134 transferring first heat H1 from the engine bleed air 128 in the duct system 156 to the second portion 122b of the ram air 122 in the engine duct 110, so as to cool the engine bleed air 128 into first cooled air 138a in the duct system 156; a second heat exchanger 136 connected to a fuel line 180 and to the duct system 156 downstream of the first heat exchanger 134, the second heat exchanger 136 transferring second heat H2 from the first cooled air 138a to the fuel 130 in the fuel line 180 so as to cool the first cooled air 138a into second cooled air 138b in the duct system 156; a VCS 140 including an evaporator 145a connected to the duct system 156 downstream of the second heat exchanger 136, the evaporator 145a cooling the second cooled air 138b into third cooled air 138c in the duct system 156; a first turbine 160 connected to the duct system 156 downstream of the VCS evaporator 140, the first turbine 160 expanding the third cooled air 138c cooled from the engine bleed air 128a compressed in the intermediate compressor stage 106c using a first pressure ratio PR1, so as to form first expanded cooled air 148a having a temperature lower than the third cooled air 138*c*; and a second turbine 162 connected the duct system 156 downstream of the VCS evaporator 140, the second turbine 162 expanding the third cooled air 138*c* cooled from the engine bleed air 128 compressed in the intermediate compressor stage 106*c* using a second pressure ratio PR2 greater than the first pressure ratio PR1, so as to form second expanded cooled air 148*b* cooler than the third cooled air 138*c*; a turbine shaft 164 connected to the first turbine 160 and the second turbine 162 so that rotation of the first turbine and/or the second turbine 162 in response to flow and expansion of the third cooled air 138*c* through the first turbine 160 and/or second turbine 162 drives the turbine shaft 164; and a third heat exchanger 170*a*, 170*b* coupled to the duct system 156 downstream of the first turbine 160 and the second turbine 162, the third heat exchanger 170*a*, 170*b* transferring third heat H3 from a heat load 190 to the first expanded cooled air 148*a* or the second expanded cooled air 148*b* when the heat load 190 is coupled to the third heat exchanger 170*a*, 170*b*.

The TMS is more efficient at cooling heat loads than an air cycle system using cooling engine bleed air outputted from the final compressor stage 106*b*, because there is less energy penalty for removing heat from the interstage engine bleed air 126*a* (as compared to removing the heat from engine bleed air outputted form the final compressor stage 106*b*).

14. In a fourteenth example, the second turbine 162 has a larger diameter than the first turbine. In this way, the second turbine 162 expands and cools the third cooled air 138*c* (generated using a higher-pressure ratio PR2) more efficiently than would be possible using the first turbine 160; and the first turbine 160 expands and cools the third cooled air 138*c* (generated using a lower pressure ratio PR2<PR1) more efficiently than would be possible using the second turbine 162.

15. In a fifteenth example, the TMS 102 of any one or combination of the previous examples is connected to an aircraft engine 100 on a supersonic military aircraft. Such aircraft have significantly higher heat loads but must be lightweight to maximize speed and maneuverability of the aircraft. The TMS according to embodiments presented herein is sufficiently lightweight to maintain the aircraft's supersonic speed and maneuverability while at the same time cooling the heat loads generated by the aircraft under all flight conditions.

16. In a sixteenth example, the heat load 190 of one or any combination of previous examples comprises at least one system selected from an aircraft avionics system and an aircraft cabin air conditioning system. The TMS according to embodiments presented herein is capable of cooling these significant heat loads (e.g., at least 90 kilowatts (kW)) under all flight conditions.

17. In a seventeenth example, the TMS includes a fan 108 drawing a first portion 122*a* of ram air 122 into an engine compressor 112 in an aircraft engine core 106 and a second portion 122*b* of the ram air 122 into an engine duct 110 bypassing the aircraft engine core 106; the engine compressor 112 compressing the first portion 122*a* of the ram air 122 so as to form compressed air 126, the engine compressor 112 including a first compressor stage 106*a*, a final compressor stage 106*b*, and one or more intermediate compressor stages 106*c* between the first compressor stage 106*a* and the final compressor stage 106*b*, each of the intermediate compressor stages 106*c* compressing the compressed air 126 outputted from a previous intermediate compressor stage 106*c* or first compressor stage 106*a* so as to form interstage compressed air 126*a*; and a cooling system 199 connected to the engine compressor 112, the cooling system cooling a portion of the interstage compressed air 126*a* (engine bleed air 128) outputted from the engine compressor 112, the cooling system including: a first turbine 160, the first turbine 160 expanding the engine bleed air 128 compressed in the intermediate compressor stage 106*c* using a first pressure ratio PR1, so as to cool the engine bleed air 128 into first expanded cooled air 148*a* having a temperature lower than the engine bleed air 128; a second turbine 162, the second turbine 162 expanding the engine bleed air 128 compressed in the intermediate compressor stage 106*c* using a second pressure ratio PR2 greater than the first pressure ratio PR1, so as to cool the engine bleed air 128 into second expanded cooled air 148*b*; and a turbine shaft 164 connected to the first turbine 160 and the second turbine 162 so that rotation of the first turbine 160 and/or the second turbine 162 in response to flow and expansion of the engine bleed air 128 through the first turbine 160 and/or second turbine 162 drives the turbine shaft 164; and a heat exchanger 170*a*, 170*b* transferring heat H3 from a heat load 190 to the first expanded cooled air 148*a* or the second expanded cooled air 148*b* when the heat load 190 is coupled to the third heat exchanger 170*a*, 170*b*. In this way, the engine bleed air 128 can be used to cool significant heat loads 190 as found on aircraft 700 while reducing the impact on aircraft performance (e.g., reducing fuel consumption and increasing aircraft range).

18. In an eighteenth example, the cooling system 199 further includes a plurality of cooling stages 199*a*, 199*b*, 199*c* that successively cool the engine bleed air 128 prior to the engine bleed air 128 being further cooled by the first turbine 160 or the second turbine 162.

19. In a nineteenth example, the cooling system 199 of Example 18 includes the device 102*a* of Example 1 cooling the engine bleed air 128 in three cooling stages 199*a*, wherein the first cooling stage comprises the first heat exchanger 134, the second cooling stage 199*b* comprises second heat exchanger 136, and the third cooling stage 199*c* comprises the VCS 140, and the first turbine 160 expands the third cooled air 138*c* cooled from the hot air 128*d* compressed in the engine core 106 using a first pressure ratio PR1; and the second turbine 162 expands the third cooled air 138*c* cooled from the hot air 128*d* compressed in the engine core 106 when the hot air 128*d* is compressed in the engine core 106 using a second pressure ratio PR2 larger than the first pressure ratio PR1.

Method of Operation

Figure 6:
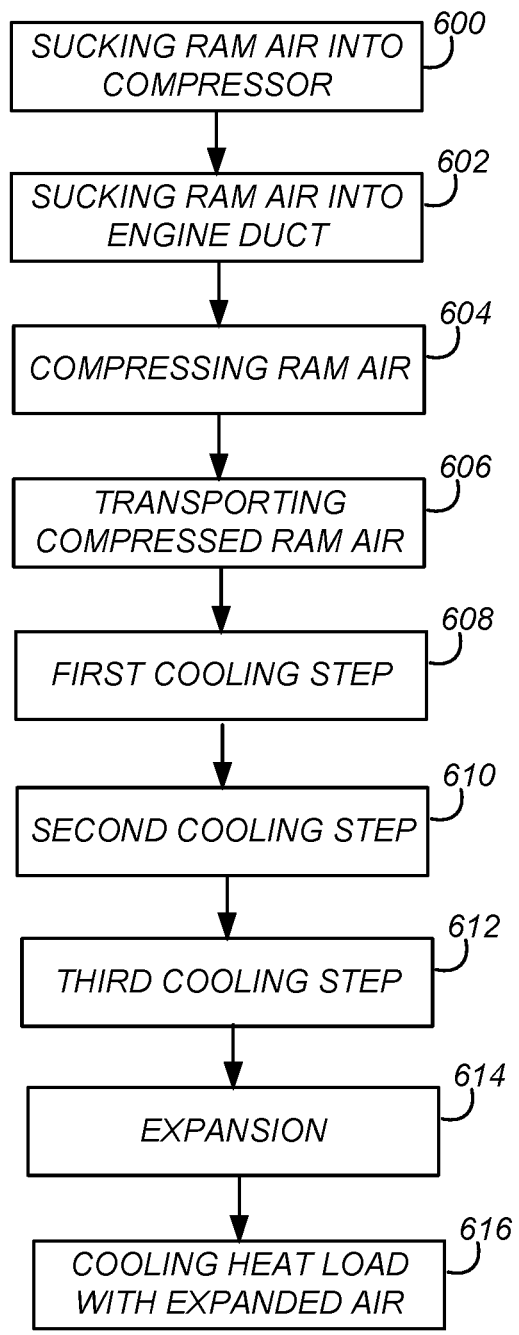
FIG. 6 is a flowchart illustrating a method of operating the TMS.
Figure 7:
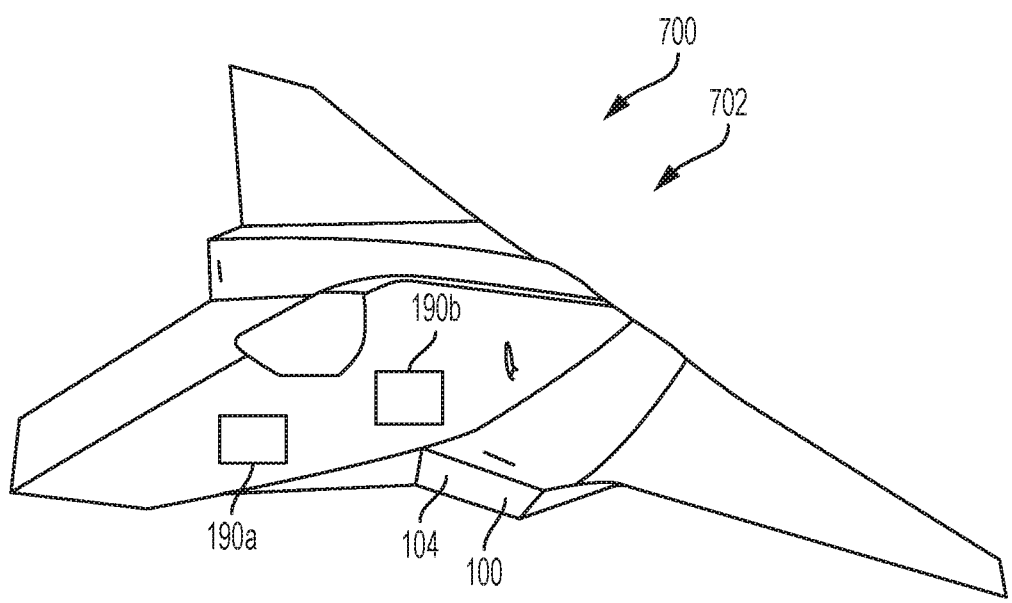
FIG. 7 illustrates an exemplary aircraft including the TMS.

FIG. 6 is a flowchart illustrating a method of operating a thermal management system and cooling a heat load on an aircraft. Examples of aircraft 700 include, but are not limited to, a supersonic military aircraft 702 as illustrated in FIG. 7.

Block 600 represents drawing a first portion 122*a* of ram air 122 through a fan into a compressor in an engine core.

Block 602 represents drawing a second portion 122*b* of the ram air 122 through the fan into an engine duct bypassing the engine core.

Block 604 represents compressing the first portion 122*a* of the ram air 122 in the compressor so as to form compressed air.

Block 606 represents transporting a portion of the compressed air, comprising engine bleed air, from the compressor (e.g. using a duct system). The engine bleed air is outputted from an intermediate compressor stage 106*c* in the compressor 112.

Block 608 represents a first cooling step, comprising transferring (e.g. using a first heat exchanger) first heat from the engine bleed air to the second portion 122*b* of the ram air 122 in the engine duct, so as to cool/form the engine bleed air into first cooled air in the duct system.

Block 610 represents a second cooling step, comprising transferring (e.g., using a second heat exchanger) second heat from the first cooled air to a fluid (e.g., fuel, coolant) so as to cool/form the first cooled air into second cooled air in the duct system.

In one or more examples, the step further includes transporting a third portion of the ram air from an engine intake upstream of the fan; and cooling the fuel using the third portion of the ram air prior to using the fuel to cool the first cooled air and when the fuel is warmer than the third portion of ram air.

Block 612 represents a third cooling step, comprising cooling the second cooled air using a vapor cycle (VCS) evaporator so as to form third cooled air in the duct system.

Block 614 represents expanding the third cooled air. The third cooled air is expanded in the first turbine 160 when the intermediate compressor stage 106c compresses the first portion 122a of ram air 122 using a first pressure ratio, so as to form the third cooled air into first expanded cooled air. The third cooled air is expanded in a second turbine 162 when the intermediate compressor stage 106c compresses the first portion 122a of ram air 122 using a second pressure ratio greater than the first pressure ratio, so as to form the third cooled air into second expanded cooled air.

Block 616 represents transferring third heat from a heat load to the first expanded cooled air or the second expanded cooled air (e.g., using a third heat exchanger).

Processing Environment

Figure 8:
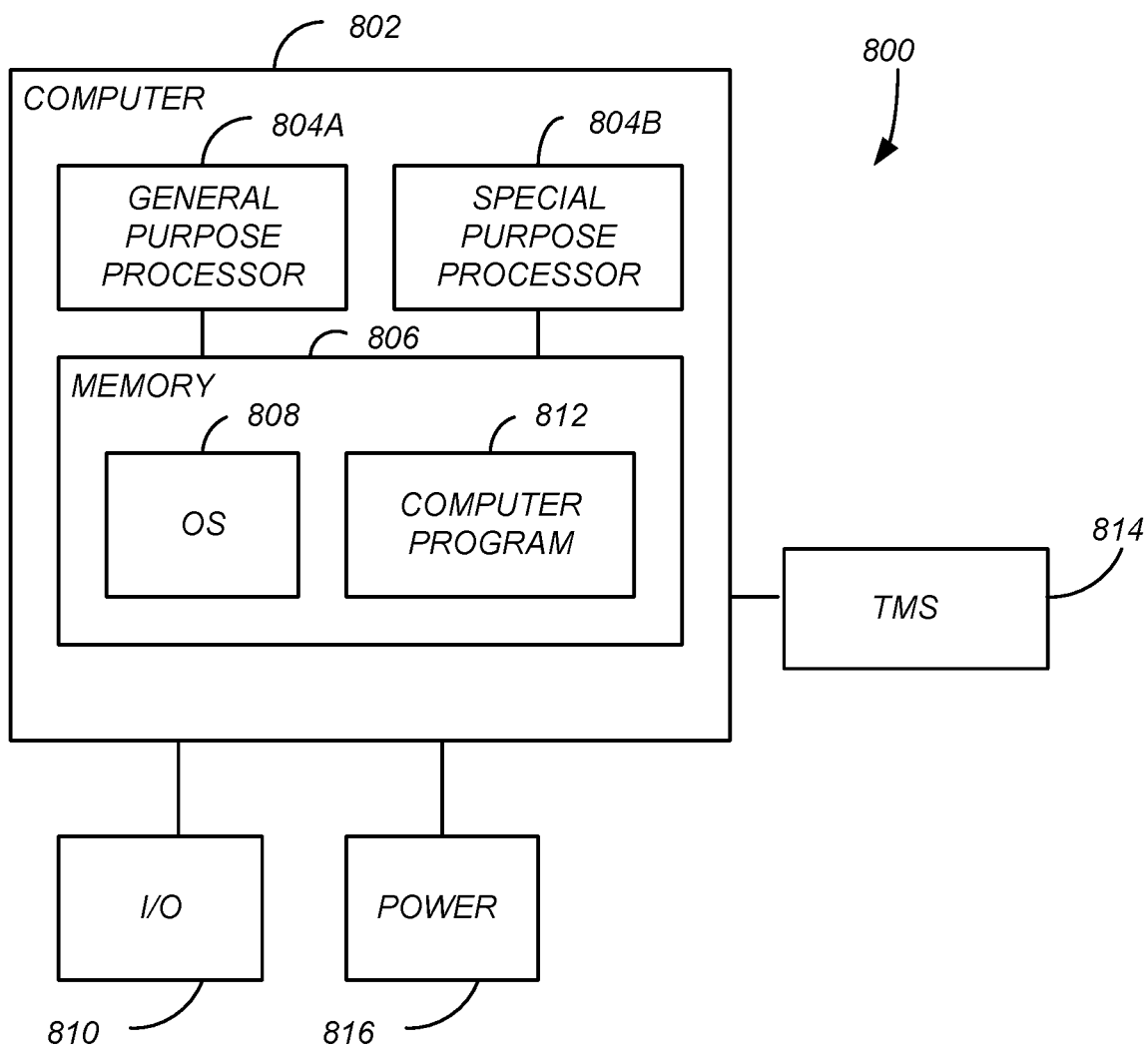
FIG. 8 illustrates an exemplary hardware environment for controlling the TMS.

FIG. 8 illustrates an exemplary system 800 used to implement processing elements needed to control the TMS. In other examples, the system 800 is a flight control system used to control the TMS as described herein.

The computer 802 comprises a processor 804 (general purpose processor 804A and special purpose processor 804B) and a memory, such as random access memory (RAM) 806. Generally, the computer 802 operates under control of an operating system 808 stored in the memory 806, and interfaces with the user/other computers to accept inputs and commands (e.g., analog or digital signals from the crew or flight control system) and to present results through an input/output (I/O) module 810. The computer program application 812 accesses and manipulates data stored in the memory 806 of the computer 802. The operating system 808 and the computer program 812 are comprised of instructions which, when read and executed by the computer 802, cause the computer 802 to perform the operations and/or methods herein described, controlling opening and closing of the valve 196 so that a third portion of the ram air 122 flows to a fourth heat exchanger 172 on demand. In one embodiment, instructions implementing the operating system 808 and the computer program 812 are tangibly embodied in the memory 806, thereby making one or more computer program products or articles of manufacture capable of controlling the TMS as described herein. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Advantages and Improvements

Conventional air cycle cooling systems employ high pressure bleed air extracted from the final stage of the engine compressor and a ram air heat sink to generate cold air for aircraft cooling. However, employing final stage compressor bleed air is not a viable solution for the next generation military aircraft engine because the compressor discharge temperatures in such engines are too high for cooling using existing heat exchanger technologies.

Although extracting final stage compressor bleed air imposes the most severe performance penalty for the aircraft, utilizing a lower pressure source of engine air (e.g., interstage bleed air) is not an option in conventional air cycle cooling system because the resulting air cycle weight and ram air heat sink cooling requirements would be prohibitively high. Thus, the high aircraft cooling loads associated with the next generation aircraft negate the use of existing air cycle systems whose low efficiencies would result in unacceptable vehicle performance penalties.

The TMS presented herein, on the other hand, uses expansion cooling and/or three stage cooling of the engine bleed air so as to allow the interstage engine bleed air 128 to be used as a heat sink for significantly higher heat loads (e.g., at least 100 kW, e.g., as found in next generation military aircraft) while maintaining aircraft performance (e.g., extended range) at a variety of flight conditions (pressure ratios PR1, PR2).

Conclusion

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A thermal management system (TMS) comprising:
 a fan drawing a first portion of ram air into an engine compressor in an aircraft engine core and a second portion of the ram air into an engine duct bypassing the aircraft engine core;
 the engine compressor compressing the first portion of the ram air so as to form compressed air, the engine compressor including a first compressor stage, a final compressor stage, and one or more intermediate compressor stages between the first compressor stage and the final compressor stage, each of the intermediate compressor stages compressing the compressed air outputted from a previous intermediate compressor stage or first compressor stage so as to form interstage compressed air;
 a duct system transporting a portion of the interstage compressed air (engine bleed air) from the engine compressor;
 a first heat exchanger connected to the duct system and the engine duct the first heat exchanger transferring first heat (H1) from the engine bleed air in the duct system to the second portion of the ram air in the engine duct, so as to cool the engine bleed air into first cooled air in the duct system;
 a second heat exchanger connected to a fuel line and to the duct system downstream of the first heat exchanger, the second heat exchanger transferring second heat (H2)

from the first cooled air to the fuel in the fuel line so as to cool the first cooled air into second cooled air in the duct system;

a vapor cycle system (VCS) including an evaporator connected to the duct system downstream of the second heat exchanger, the evaporator cooling the second cooled air into third cooled air in the duct system;

a first turbine connected to the duct system downstream of the evaporator the first turbine expanding the third cooled air cooled from the engine bleed air compressed in the intermediate compressor stage using a first pressure ratio (PR1), so as to form first expanded cooled air having a temperature lower than the third cooled air; and a second turbine connected to the duct system downstream of the evaporator, the second turbine expanding the third cooled air cooled from the engine bleed air compressed in the intermediate compressor stage using a second pressure ratio (PR2) greater than the first pressure ratio (PR1), so as to form second expanded cooled air having a temperature lower than the third cooled air, wherein the third cooled air does not flow through both the first turbine and the second turbine;

a turbine shaft connected to the first turbine and the second turbine so that rotation of the first turbine and/or the second turbine in response to flow of the third cooled air through the first turbine and/or second turbine drives the turbine shaft; and a third heat exchanger coupled to the duct system downstream of the first turbine and the second turbine, the third heat exchanger transferring third heat (H3) from a heat load to the first expanded cooled air or the second expanded cooled air when the heat load is coupled to the third heat exchanger.

2. The TMS of claim 1 connected to an aircraft engine including the fan coupled to the aircraft engine core, the aircraft engine core further including:
a combustor;
a low pressure turbine;
a high pressure turbine; and
an engine rotor shaft connecting the engine compressor, the low pressure turbine and the high pressure turbine, wherein:
the combustor burns the fuel using the compressed air so as to form exhaust gases that rotate the low pressure turbine and the high pressure turbine so as to drive the engine rotor shaft and the engine compressor, wherein the first turbine or the second turbine is employed for cooling the third cooled air depending on a flight condition of an aircraft including the engine, the flight condition including at least one of an engine thrust of the aircraft engine and an altitude of the aircraft.

3. The TMS of claim 2, further including a gearbox connecting the turbine shaft and the engine rotor shaft, the gearbox transmitting power (P) to the engine rotor shaft in response to the flow and expansion of the third cooled air through the first turbine or the second turbine driving the turbine shaft.

4. The system of claim 2, further comprising:
a generator connected to the turbine shaft, wherein the generator generates electrical power E in response to flow and expansion of the third cooled air through the first turbine or the second turbine.

5. The TMS of claim 2, wherein the heat load comprises at least one system selected from an aircraft avionics system and an aircraft cabin air conditioning system.

6. A supersonic military aircraft comprising the TMS of claim 1.

7. The TMS of claim 2, further comprising:
an additional duct connected to an engine intake upstream of the fan, the additional duct transporting a third portion of the ram air to a fourth heat exchanger, the fourth heat exchanger thermally coupled to the fuel line upstream of the second heat exchanger such that the fuel is cooled by the third portion of the ram air prior to receiving the second heat (H2) from the first cooled air.

8. The TMS of claim 7, further comprising an additional fan drawing the third portion of the ram air into the additional duct so as to ensure an adequate flow of the third portion of the ram air during ground idle and ground speed operation of the aircraft engine.

9. The TMS of claim 8, wherein the duct system includes a bypass loop comprising a conduit bypassing the second heat exchanger so as to control an amount of the second heat (H2) transferred to the fuel.

10. The TMS of claim 8 coupled to an aircraft propelled by the aircraft engine, the system further comprising:
a valve connected to the additional duct controlling flow of the third portion of the ram air to the fourth heat exchanger;
a computer controlling opening and closing of the valve so that:
the third portion of the ram air flows to the fourth heat exchanger when the aircraft is flying subsonically at an altitude at which the fuel is warmer than the third portion of the ram air, and
flow of the third portion of the ram air to the fourth heat exchanger is suppressed or switched off when the aircraft is flying supersonically at the altitude.

11. The TMS of claim 1, wherein:
the second turbine has a larger diameter than the first turbine so that:
the second turbine expands and cools the third cooled air generated using the second pressure ratio PR2 more efficiently than would be possible using the first turbine; and
the first turbine expands and cools the third cooled air generated using the first pressure ratio more efficiently than would be possible using the second turbine.

12. A thermal management system, comprising:
a fan drawing a first portion of ram air into an engine compressor in an aircraft engine core and a second portion of the ram air into an engine duct bypassing the aircraft engine core;
the engine compressor compressing the first portion of the ram air so as to form compressed air, the engine compressor including a first compressor stage, a final compressor stage, and one or more intermediate compressor stages between the first compressor stage and the final compressor stage, each of the intermediate compressor stages compressing the compressed air outputted from a previous intermediate compressor stage or first compressor stage so as to form interstage compressed air;
a cooling system connected to the engine compressor, the cooling system cooling a portion of the interstage compressed air (engine bleed air) outputted from the engine compressor, the cooling system including:
a first turbine, the first turbine expanding the engine bleed air compressed in the intermediate compressor stage using a first pressure ratio (PR1), so as to form first expanded cooled air having a temperature lower than the engine bleed air;
a second turbine, the second turbine expanding the engine bleed air compressed in the intermediate compressor stage using a second pressure ratio (PR2) greater than the first pressure ratio (PR1), so as to form second expanded cooled air having a temperature lower than the engine bleed air, wherein the bleed air does not flow through both the first turbine and the second turbine; and
a turbine shaft connected to the first turbine and the second turbine so that rotation of the first turbine and/or the second turbine in response to flow and expansion of the engine bleed air through the first turbine and/or second turbine drives the turbine shaft; and
a third heat exchanger transferring heat (H3) from a heat load to the first expanded cooled air or the second expanded cooled air when the heat load is coupled to the third heat exchanger.

13. The system of claim 12, wherein the cooling system further includes a plurality of cooling stages that successively cool the engine bleed air prior to the engine bleed air being further cooled by the expansion in the first turbine or the second turbine.

14. A device for cooling air from an aircraft engine of an aircraft comprising an engine body housing an engine core; a fan disposed upstream of the engine core so as to draw ram air into the engine core; and the engine core including an engine compressor compressing a first portion of the ram air so as to form hot air; said device comprising:
a duct system for transporting the hot air from the engine core;
means for directing a second portion of the ram air comprising cold air outside the engine core;
a first heat exchanger for transferring first heat (H1) from the hot air to the cold air, so that the hot air is cooled to first cooled air;
a second heat exchanger coupled to the duct system, for transferring second heat (H2) from the first cooled air to a fluid, so as to cool the first cooled air to second cooled air; and
means for cooling the second cooled air into third cooled air, and
a first turbine for expanding the third cooled air cooled from the hot air compressed in the engine compressor when the hot air is compressed in the engine compressor using a first pressure ratio (PR1), the third cooled air expanded into first expanded cooled air by the first turbine a second turbine for expanding the third cooled air cooled from the hot air compressed in compressor, when the hot air is compressed in the engine compressor using a second pressure ratio (PR2) larger than the first pressure ratio (PR), the third cooled air expanded into second expanded cooled air by the second turbine, wherein the third cooled air does not flow through both the first turbine and the second turbine; and
a turbine shaft connecting the first turbine and the second turbine.

15. The device (102a) of claim 14, wherein the fluid is fuel.

16. The device of claim 14, further comprising third heat exchanger coupled to the duct system downstream of the first turbine and the second turbine, the third heat exchanger transferring third heat (H3) from a heat load to the first expanded cooled air or the second expanded cooled air when the heat load is coupled to the third heat exchanger.

17. The device of claim 14 connected to the aircraft engine, the engine core further including:
a combustor;
a low pressure turbine;
a high pressure turbine; and
an engine rotor shaft connecting the engine compressor, the low pressure turbine, and the high pressure turbine, wherein:
the combustor burns fuel using the hot air so as to form exhaust gases that rotate the low pressure turbine and the high pressure turbine so as to drive the engine rotor shaft and the engine compressor.

18. The device of claim 17, wherein the aircraft engine further includes a gearbox connecting the turbine shaft and the engine rotor shaft, the gearbox transmitting power (P) to the engine rotor shaft in response to flow and the expansion of the third cooled air through the first turbine or the second turbine driving the turbine shaft.

19. The device of claim 17 further comprising a generator connected to the turbine shaft, wherein the generator generates electrical power (E) in response to flow and the expansion of the third cooled air through the first turbine or the second turbine.

20. The device of claim 17, further comprising:
means for transporting a third portion of the ram air from an engine intake of the aircraft engine upstream of the fan; and
means for cooling the fluid using the third portion of the ram air to cool the engine bleed air using the fluid when the aircraft is flying sub sonically at an altitude greater than 40000 feet.

* * * * *